(12) United States Patent
Ali et al.

(10) Patent No.: US 11,514,658 B2
(45) Date of Patent: Nov. 29, 2022

(54) ENHANCING THREE-DIMENSIONAL MODELS USING MULTI-VIEW REFINEMENT

(71) Applicant: QUALCOMM Incorporated, San Diego, CA (US)

(72) Inventors: Ashar Ali, San Diego, CA (US); Gokee Dane, San Diego, CA (US); Gerhard Reitmayr, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/153,773

(22) Filed: Jan. 20, 2021

(65) Prior Publication Data

US 2022/0230406 A1 Jul. 21, 2022

(51) Int. Cl.
*G06T 17/20* (2006.01)
*G06T 19/20* (2011.01)
*G06T 15/20* (2011.01)

(52) U.S. Cl.
CPC ............ *G06T 19/20* (2013.01); *G06T 15/205* (2013.01); *G06T 17/20* (2013.01); *G06T 2215/16* (2013.01); *G06T 2219/028* (2013.01); *G06T 2219/2016* (2013.01)

(58) Field of Classification Search
None
See application file for complete search history.

(56) References Cited

U.S. PATENT DOCUMENTS

| 2014/0267666 A1* | 9/2014 | Holz | G06T 7/30 348/77 |
|---|---|---|---|
| 2016/0092739 A1* | 3/2016 | Oami | G06V 20/52 348/159 |
| 2017/0292836 A1* | 10/2017 | Jia | G06T 7/85 |
| 2018/0329509 A1* | 11/2018 | Horowitz | G06F 3/017 |
| 2019/0094981 A1* | 3/2019 | Bradski | G06F 3/017 |

(Continued)

OTHER PUBLICATIONS

Sock, Juil, et al. "Multi-view 6D object pose estimation and camera motion planning using RGBD images." Proceedings of the IEEE International Conference on Computer Vision Workshops. 2017. (Year: 2017).*

(Continued)

*Primary Examiner* — Sultana M Zalalee
(74) *Attorney, Agent, or Firm* — Qualcomm Incorporated

(57) ABSTRACT

Systems and techniques are provided for modeling three-dimensional (3D) meshes using multi-view image data. An example method can include determining, based on a first image of a target, first 3D mesh parameters for the target corresponding to a first coordinate frame; determining, based on a second image of the target, second 3D mesh parameters for the target corresponding to a second coordinate frame; determining third 3D mesh parameters for the target in a third coordinate frame, the third 3D mesh parameters being based on the first and second 3D mesh parameters and relative rotation and translation parameters of image sensors that captured the first and second images; determining a loss associated with the third 3D mesh parameters, the loss being based on the first and second 3D mesh parameters and the relative rotation and translation parameters; determining 3D mesh parameters based on the loss and third 3D mesh parameters.

30 Claims, 8 Drawing Sheets

(56) References Cited

U.S. PATENT DOCUMENTS

2019/0180084 A1* 6/2019 Bouaziz ............... G06T 17/20
2019/0197196 A1* 6/2019 Yang .................... G02B 27/017
2020/0184721 A1   6/2020 Ge et al.
2020/0311397 A1* 10/2020 Sawhney ............ G06F 3/04815

OTHER PUBLICATIONS

Ali A., "3D Human Pose Estimation", May 7, 2019 (May 7, 2019), 43 Pages,. XP055914087, DOI: http://hdl.handle.net/1853/61286 Retrieved from the Internet: URL: https://smartech.gatech.edu/bitstream/handle/1853/61286/ALI-THESIS-2019.pdf?sequence=1 [retrieved on Apr. 20, 2022] abstract p. 6-p. 7 p. 20-p. 21 p. 25, figure 4.3.
International Search Report and Written Opinion—PCT/US2022/070237—ISA/EPO—dated May 3, 2022.
Mehta D., et al., "Monocular 3D Human Pose Estimation in the Wild Using Improved CNN Supervision", 2017 International Conference on 3D Vision(3DV), IEEE, Oct. 10, 2017 (Oct, 10 2017), pp. 506-516, XP033353257, DOI: 10.1109/3DV.2017.00064 [retrieved on Jun. 6, 2018] abstract p. SOB.
Toshpulatov M., et al., "Human Pose, Hand and Mesh Estimation using Deep Learning: A Survey", The Journal of Super Computing, Springer US, New York vol. 78, No. 6, Jan. 1, 2022 (Jan. 1, 2022), pp. 7616-7654, XP037788570, ISSN: 0920-8542, DOI:10.1007/S11227-021-04184-7 [retrieved on Jan. 1, 2022-] the whole document.

* cited by examiner

ENHANCING THREE-DIMENSIONAL MODELS USING MULTI-VIEW REFINEMENT

TECHNICAL FIELD

The present disclosure generally relates to image processing, and more specifically to techniques and systems for enhancing three-dimensional models of parametric meshes using multi-view refinement.

BACKGROUND

Many devices and systems are capable of generating images (or frames) and/or video data (including multiple frames) that capture scenes, objects, people, and shapes, among other things. For example, a camera or a computing device including a camera (e.g., a mobile device such as a mobile telephone or smart device including one or more cameras) can capture an image of a scene, a person, and/or an object. The image can be captured and processed by such devices and systems and output for consumption (e.g., displayed on a device). The image captured can also be further processed for certain applications such as, for example, computer graphics, extended reality (e.g., augmented reality, virtual reality, and the like), image recognition (e.g., shape recognition, object recognition, scene recognition, etc.), and feature estimation, among others. For example, an image can be processed to detect any objects or faces (e.g., using face or object recognition, etc.) that are present in the image, which can be useful for various applications.

In some cases, image data captured by a device can be used to construct a three-dimensional (3D) model of a target (e.g., an object, person, shape, etc.) in the image data. The 3D model can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, industrial design, and health care, among others. 3D modeling can be challenging and complex, particularly when modeling articulated objects. Moreover, 3D modeling technologies are often inaccurate and inconsistent, and have difficulty dealing with noise, ambiguities, and configuration changes, among other things. In many cases, 3D modeling technologies require manual tuning of thresholds for feature matching and can fail or require retraining when a capturing device is repositioned.

BRIEF SUMMARY

In some examples, techniques and systems are described for enhancing three-dimensional (3D) modeling of parametric meshes. According to at least one illustrative example, a method of modeling 3D parametric meshes using multi-view refinement is provided. In some examples, the method can include determining, based on a first image of a target, first three-dimensional (3D) mesh parameters for the target, wherein the first 3D mesh parameters correspond to a first coordinate reference frame associated with the first image; determining, based on a second image of the target, second 3D mesh parameters for the target, wherein the second 3D mesh parameters correspond to a second coordinate reference frame associated with the second image; determining third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and generating adjusted 3D mesh parameters based on the third 3D mesh parameters one or more losses associated with the third 3D mesh parameters, the adjusted 3D mesh parameters comprising one or more adjustments to the third 3D mesh parameters.

According to at least one illustrative example, a non-transitory computer-readable medium is provided for modeling 3D parametric meshes using multi-view refinement is provided. In some aspects, the non-transitory computer-readable medium can include instructions that, when executed by one or more processors, cause the one or more processors to determine, based on a first image of a target, first three-dimensional (3D) mesh parameters for the target, wherein the first 3D mesh parameters correspond to a first coordinate reference frame associated with the first image; determine, based on a second image of the target, second 3D mesh parameters for the target, wherein the second 3D mesh parameters correspond to a second coordinate reference frame associated with the second image; determine third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and generate adjusted 3D mesh parameters based on the third 3D mesh parameters and one or more losses associated with the third 3D mesh parameters, the adjusted 3D mesh parameters comprising one or more adjustments to the third 3D mesh parameters.

According to at least one illustrative example, an apparatus is provided for modeling 3D parametric meshes using multi-view refinement is provided. In some aspects, the apparatus can include memory having stored thereon computer-readable instructions and one or more processors configured to determine, based on a first image of a target, first three-dimensional (3D) mesh parameters for the target, wherein the first 3D mesh parameters correspond to a first coordinate reference frame associated with the first image; determine, based on a second image of the target, second 3D mesh parameters for the target, wherein the second 3D mesh parameters correspond to a second coordinate reference frame associated with the second image; determine third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and generate adjusted 3D mesh parameters based on the third 3D mesh parameters and one or more losses associated with the third 3D mesh parameters, the adjusted 3D mesh parameters comprising one or more adjustments to the third 3D mesh parameters.

According to another illustrative example, an apparatus for modeling 3D parametric meshes using multi-view refinement can include means for determining, based on a first image of a target, first three-dimensional (3D) mesh parameters for the target, wherein the first 3D mesh parameters correspond to a first coordinate reference frame associated with the first image; determining, based on a second image of the target, second 3D mesh parameters for the target, wherein the second 3D mesh parameters correspond to a second coordinate reference frame associated with the second image; determining third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and generating adjusted 3D mesh parameters based on the third 3D mesh parameters and one or more losses associated with the third 3D mesh parameters, the adjusted 3D mesh parameters comprising one or more adjustments to the third 3D mesh parameters.

In some aspects, the method, apparatuses, and computer-readable medium described above can include transforming the third 3D mesh parameters to the first coordinate reference frame and the second coordinate reference frame; and aligning the third 3D mesh parameters with root-relative coordinates associated with the first 3D mesh parameters and the second 3D mesh parameters. In some examples, the third 3D mesh parameters are aligned with the root-relative coordinates by subtracting a depth of root associated with the root-relative estimates associated with the first 3D mesh parameters and the second 3D mesh parameters.

In some aspects, the method, apparatuses, and computer-readable medium described above can include determining the one or more losses based on the second 3D mesh and the third 3D mesh. The one or more losses can include a loss between the second 3D mesh and the third 3D mesh.

In some examples, the first coordinate reference frame can include a first root-relative frame and the second coordinate reference frame can include a second root-relative frame. In some examples, the third coordinate reference frame can include a real-world coordinate frame in a scene associated with the first image and the second image.

In some examples, determining the third 3D mesh parameters can include converting 3D coordinates in the first root-relative frame and the second root-relative frame to 3D coordinates in the real-world coordinate frame; and determining the third 3D mesh parameters based on the 3D coordinates in the real-world coordinate frame, the third 3D mesh parameters modeling the target in the real-world coordinate frame. In some cases, the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

In some examples, determining the first 3D mesh parameters and the second 3D mesh parameters can include determining a first root-relative pose of the target in the first image and a second root-relative pose of the target in the second image. In some examples, the first 3D mesh parameters can include the first root-relative pose and the second 3D mesh parameters comprise the second root-relative pose.

In some examples, the one or more losses can be calculated based on the first 3D mesh parameters, the second 3D mesh parameters, and the relative rotation and translation parameters. In some aspects, the method, apparatuses, and computer-readable medium described above can include determining the one or more losses associated with the third 3D mesh parameters based on the first 3D mesh parameters, the second 3D mesh parameters, and the relative rotation and translation parameters.

In some examples, the one or more losses are calculated based on a least square errors function. In some cases, determining the adjusted 3D mesh parameters can include minimizing an error in the third 3D mesh parameters based on the least square errors function.

In some examples, determining the one or more losses can include generating, based on the third 3D mesh parameters and the relative rotation and translation parameters, a first 3D mesh in the first coordinate reference frame and a second 3D mesh in the second coordinate reference frame.

In some aspects, the method, apparatuses, and computer-readable medium described above can include generating a 3D mesh model based on the adjusted 3D mesh parameters. In some examples, the target can include an articulated object and the 3D mesh model can include a skinned model. In some examples, the first image and the second image can include monocular images.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
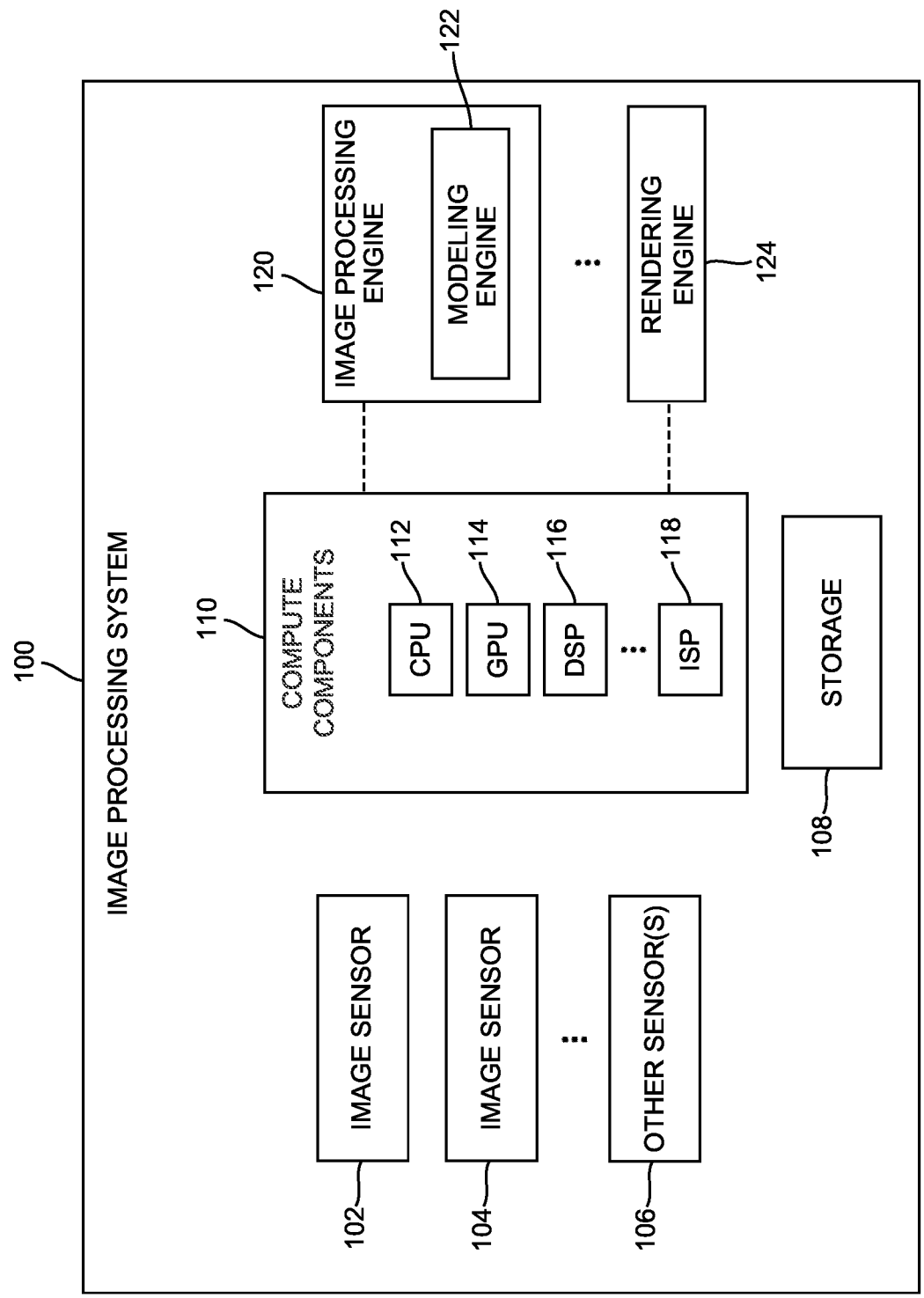
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, three-dimensional (3D) models can be constructed for objects captured in images. The 3D models can be used in a variety of applications such as, for example, multimedia (e.g., movies, video games, extended reality, etc.), computer vision (e.g., motion tracking, shape modeling, object mapping, image recognition, pose estimation, image registration and warping, scene reconstruction, image segmentation, animation, etc.), robotics and automation, industrial design, and health care, among others. However, 3D modeling can be challenging and complex, particularly when modeling articulated objects. Moreover, 3D modeling technologies are often inaccurate and inconsistent, and have difficulty dealing with noise, ambiguities, and configuration changes, among other things. In many cases, 3D modeling technologies require manual tuning of thresholds for feature matching and can fail or require retraining when a capturing device is repositioned.

For example, stereo algorithms can be used to calculate depth information for objects captured by images. The depth information can be used to model the objects in the images. However, stereo algorithms generally depend on effective two-dimensional (2D) feature matching. Moreover, stereo algorithms often require manual tuning of thresholds for feature matching. In addition, with stereo algorithms, it is difficult to preserve epipolar constraints when lenses have inherent radial distortion.

In some cases, deep learning algorithms can be used to calculate depth information and model objects in images. However, deep learning algorithms are inflexible and often require significant training and retraining. For example, deep learning algorithms are constrained by the stereo geometry they are trained on and fail when the image capturing devices are assembled with a different geometry for other use cases. In such scenarios, the deep learning algorithms may need to be retrained for the specific stereo geometry being implemented.

The technologies and systems described herein can be used to enhance and improve 3D modeling of objects in images. According to some examples, the technologies and systems described herein can enhance and improve 3D modeling of parametric meshes using multi-view refinement. In some examples, the technologies and systems described herein can refine 3D parametric mesh estimates of objects using stereo or multi-view image capturing device setups. The 3D modeling approaches described herein can limit or eliminate a need to manually tune thresholds for stereo feature matching and can stereo feature matching independent of any inconsistencies in epipolar constraints due to distortion.

The 3D modeling approaches described herein can also allow flexible depth estimation from multi-view images (e.g., images having different reference frames). The 3D modeling approaches described herein can be scaled to any number of image views (or image capturing device views) with limited or minimal increases in power, latency, resource usage, etc. The 3D modeling approaches described herein can but do not need to learn image capturing device calibrations. Thus, the 3D modeling approaches described herein are flexible to any changes in multi-view geometries (e.g., changes in reference frames of image capturing devices and/or input images) and do not need additional training or retraining upon an changes in multi-view geometries.

Examples of the systems and techniques described herein for 3D modeling are illustrated in FIG. 1 through FIG. 8 and described below. FIG. 1 is a diagram illustrating an example image processing system 100. The image processing system 100 can perform 3D modeling, as further described herein. Moreover, the image processing system 100 can perform various image processing tasks, effects, computations, etc., such as, for example, chroma keying effects, extended reality effects, image registration and warping, motion tracking, pose estimation, object mapping, feature extraction, image recognition (e.g., face recognition, expression recognition, gender recognition, eye gaze recognition, age estimation, race estimation, object recognition, etc.), depth estimation, 3D mesh parameter refinement and fitting, parametric optimization, automation, machine vision, object modeling and registration, and/or any other image processing tasks, effects, and/or computations.

In some illustrative examples, the image processing system 100 can perform 3D modeling of parametric meshes using multi-view using multi-view image inputs. In some examples, the image processing system 100 can refine 3D parametric mesh estimates of objects using stereo or multi-view image capturing device setups. In some cases, the image processing system 100 can use linear equations to determine real-world depth information about an object captured in an image (e.g., depth information of the object within a real-world/physical scene or environment) and/or estimate a real-world coordinate frame (e.g., a coordinate system of a real-world/physical scene or environment). The image processing system 100 can use the depth information and/or real-world coordinate frame to estimate mesh parameters in the real-world coordinate frame for the object captured in the image. In some examples, the image processing system 100 can perform inference-time parametric optimization, as further described herein.

In some examples, the image processing system 100 can perform parametric 3D modeling and generate 3D skinned mesh models using multiple image views of an object. For example, the image processing system 100 can perform parametric 3D modeling and generate skinned mesh models using input images from multiple image sensors, image capturing devices, and/or monocular camera devices, such as image sensors 102 and 104. In some examples, the modeled objects can include articulated objects. An articulated object can include at least two components with up to six degrees of freedom between any of them. For example, an articulated object, an articulated object can include a collection of rigid 3D structures constrained by a fixed kinematic tree where a parent-child relationship(s) guides a motion of that object. To illustrate, an articulated object can include a structure with one or more joints or articulations (or articular surfaces) that allow one or more components (e.g., parts, portions, sub-structures, bones, etc.) of the structure to move relative to a different component(s) of the structure and/or provide a certain freedom of movement (e.g., rotational, translational, etc.) between any components of the structure. Non-limiting examples of articulated objects can include a body (e.g., a human body, certain animal bodies, etc.), a body part (e.g., a hand, a head, a leg, a foot, etc.), manipulation robots, certain tools, etc.

A skinned model can include a model of articulated objects, where vertices of a surface mesh are connected to several skeleton (e.g., structure, frame, etc.) positions and provide a soft, non-rigid and/or flexible deformation of the surface mesh (e.g., including rigid and non-rigid parts). In some example, a parametric mesh can include a 3D structure constrained by a fixed set of parameters that control the pose, location and shape of surface vertices of a modeled object. Non-limiting examples of 3D structures constrained by a fixed set of parameters that control the pose, location, and shape of surface vertices can include objects of uniform shapes such as cylinders, spheres, cuboids, as well as complex shapes and/or structures such as bodies (e.g., a human body, an animal body, etc.), body parts (e.g., a hand, etc.), a manipulator robot, etc.

In some examples, the image processing system 100 can estimate real-world depth information about an object captured in multiple images having different views (e.g., reference frames or coordinate systems) and/or images captured by multiple image capturing devices having different views. The image processing system 100 can use the images with the different views to estimate the real-world depth information about the object. For example, 3D points in the reference frames of multiple image capturing devices (e.g., image sensors 102 and 104) can have a linear relationship. In some cases, the image processing system 100 can implement a linear equation which can use the linear relationship of the image capturing devices to guide or perform a coordinate transformation. The image processing system 100 can use the linear relationship (and linear equation) to estimate and/or refine depth information from the images captured by the multiple image capturing devices.

In some examples, the image processing system 100 can generate 3D meshes of an object from multiple input images captured by multiple image capturing devices (e.g., image sensors 102 and 104). The image processing system 100 can use the 3D meshes to generate a 3D mesh of the object corresponding to a real-world frame. The image processing system 100 can refine the mesh parameters of the 3D mesh by fitting. For example, after an initial estimate of the 3D mesh parameters, the image processing system 100 can further tune the 3D mesh parameters to better fit the intermediate mesh predictions (e.g., the 3D meshes generated for the multiple input images captured by the image capturing devices). The image processing system 100 can perform refinement with optimization of parameter spaces to fit a final mesh estimate to intermediate data inferred from multiple frames (e.g., intermediate mesh parameters corresponding to different image frames). In some examples, a small or limited number of mesh parameters can be optimized for 3D fitting over intermediate meshes, reducing the search space.

In some examples, the image processing system 100 can generate 3D meshes of an object with respect to a root-relative coordinate reference frame. A root-relative frame is normalized reference frame where 3D coordinates of an object are given as x dimension coordinates, y dimension coordinates, and relative depth coordinates $Z_{rel}$, where $Z_{rel}$ is such that a centroid of the 3D object is placed at z=0 (e.g., where the z coordinate of the centroid equals 0). Root-relative frames can be used for accurate estimation of a 3D object's pose and shape from a single 2D image. In some examples, the image processing system 100 can use root-relative estimates of 3D meshes from multiple reference frames such as multiple image (and/or image capturing device) frames.

In some examples, the image processing system 100 can predict a root-relative pose of an object captured in images with multiple views (e.g., from multiple reference frames). The image processing system 100 can predict the root-relative pose of the object for each image to obtain root-relative poses from multiple views/frames. The image processing system 100 can use the root-relative poses from the multiple views/frames as intermediate outputs, as further described herein. The image processing system 100 can fit a final mesh estimate to the intermediate outputs. In some examples, the image processing system 100 can derive mesh parameters in a real-world frame from the intermediate outputs. The mesh parameters can serve as an initialization for a fitting framework. In some cases, the image processing system 100 can use calibration information for multiple image capturing devices (e.g., image sensors 102 and 104) used to capture the multi-view image data, to transform a real-world 3D mesh to the coordinate frames of the image capturing devices, and align the 3D mesh to intermediate root-relative estimates by subtracting a depth of a root. In some examples, the image processing system 100 can calculate a loss between intermediate mesh outputs, and use the loss to optimize real-world frame parameters for a better fit of the final 3D mesh.

In the example shown in FIG. 1, the image processing system 100 includes image sensors 102 and 104, a storage 108, computing components 110, an image processing engine 120, a modeling engine 122, and a rendering engine 124. The image processing system 100 can also optionally include one or more additional image sensors 106, such as an additional image sensor(s), a radar sensor, a light detection and ranging (LIDAR) sensor, an infrared (IR) sensor, a gyroscope, an accelerometer, an inertial measuring unit (IMU), an audio sensor, etc.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, an Internet-of-Things (IoT) device, or any other suitable electronic device(s).

In some implementations, the image sensors 102 and 104, the other sensor 106, the storage 108, the computing components 110, the image processing engine 120, the modeling engine 122, and the rendering engine 124 can be part of the same computing device. For example, in some cases, the image sensors 102 and 104, the other sensor 106, the storage 108, the computing components 110, the image processing engine 120, the modeling engine 122, and the rendering engine 124 can be integrated into a smartphone, laptop, tablet computer, smart wearable device, gaming system, server, and/or any other computing device. In other implementations, any of the image sensor 102, the image sensor 104, the other sensor 106, the storage 108, the computing components 110, the image processing engine 120, the modeling engine 122, and/or the rendering engine 124 can be part of two or more separate computing devices.

The image sensors 102 and 104 can include image sensors and/or image capturing devices capable of capturing images. For example, the image sensors 102 and 104 can include one or more sensors capable of capturing red-green-blue (RGB) images. In some examples, an image (or frame) can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

In some cases, the image sensors 102 and 104 can include or can be part of monocular camera devices. In some examples, the image sensors 102 and 104 can capture monocular images. The image processing system 100 can use monocular images captured by the image sensors 102 and 104 as inputs for 3D modeling as further described herein.

In some cases, the image sensors 102 and 104 can be any type of image sensor (or image capture devices) and/or video sensor (or video capture devices). For instance, the image sensors 102 and 104 can include digital camera sensors, video camera sensors, smartphone camera sensors, image/video capture devices included as part of an electronic apparatus (e.g., a television, a computer, a camera, etc.). In some cases, the image sensors 102 and 104 can be part of a camera or computing device, such as a digital camera, a video camera, an IP camera, a smartphone, a smart television, a game system, a scanner, a multi-camera system, or other computing device. For example, the image sensors 102 and 104 can be part of a dual-camera system or device, such as a smartphone, a camera, etc. The image sensors 102 and 104 can capture image data and/or video content (e.g., raw image and/or video data). The image data and/or video content can be processed by the computing components 110, the image processing engine 120, the modeling engine 122, and/or the rendering engine 124 as described herein.

The other sensor(s) 106 can be any sensor for detecting and measuring information such as distance, motion, position, depth, speed, etc. Non-limiting examples of other sensors include LIDARs, gyroscopes, accelerometers, magnetometers, IR sensors, inertial measurement units (IMUs), radar sensors, machine vision sensors, etc. In some cases, the image processing system 100 can include other sensors, such as a smart scene sensor, a speech recognition sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from the image sensor 102, the image sensor 104, the other sensor 106, the computing components 110 (e.g., parameters, outputs, generated images, calculation results, models, etc.), and/or data from any of the image processing engine 120, the modeling engine 122, and/or the rendering engine 124 (e.g., output images, processing results, models, etc.). In some examples, the storage 108 can include a buffer for storing data (e.g., image data) for processing by the computing components 110.

In some implementations, the computing components 110 can include a central processing unit (CPU) 112, a graphics processing unit (GPU) 114, a digital signal processor (DSP) 116, and/or an image signal processor (ISP) 118. The computing components 110 can perform various operations such as 3D modeling, image enhancement, object or image segmentation, computer vision, graphics rendering, extended reality (e.g., virtual reality, augmented reality, etc.), image/video processing, sensor processing, recognition (e.g., text recognition, object recognition, feature recognition, face recognition, facial expression recognition, eye gaze recognition, age recognition, gender recognition, race recognition, tracking or pattern recognition, scene change recognition, etc.), disparity detection, machine learning, depth estimation, filtering, mesh parameter refinement and fitting, and any of the various operations described herein. In some examples, the computing components 110 can implement the image processing engine 120, the modeling engine 122, and the rendering engine 124. In other examples, the computing components 110 can also implement one or more other processing engines.

The operations for the image processing engine 120, the modeling engine 122, and the rendering engine 124 can be implemented by one or more of the computing components 110. In one illustrative example, the image processing engine 120 and the modeling engine 122 (and associated operations) can be implemented by the CPU 112, the DSP 116, and/or the ISP 118, and the rendering engine 124 (and associated operations) can be implemented by the GPU 114. In some cases, the computing components 110 can include other electronic circuits or hardware, computer software, firmware, or any combination thereof, to perform any of the various operations described herein.

In some cases, the computing components 110 can receive data (e.g., image data, etc.) captured by the image sensors 102 and 104, and model an object captured in the data from the image sensors 102 and 104. In some examples, the image processing system 100 can receive an image capturing an object from image sensor 102 and another image capturing the object from image sensor 104. The different images can have different reference frames. The image processing system 100 can predict a root-relative pose of the object from each image. The image processing system 100 can use the root-relative poses from the different images to estimate a depth in a real-world frame, and generate 3D mesh parameters for the object in the real-world frame. The image processing system 100 can determine a loss from the root-relative pose information from the different images and calibration information of the image sensors 102 and 104, and use the loss to optimize the 3D mesh parameters corresponding to the real-world frame.

The computing components 110 can implement the image processing engine 120 and the modeling engine 122 to perform various image processing operations, such as 3D modeling, model optimization and fitting, object tracking, pose estimation, depth estimation, XR rendering, computer vision, etc. For example, the computing components 110 can implement the image processing engine 120 and/or the modeling engine 122 to perform 3D modeling, as further described herein. The computing components 110 can process image data captured by the image sensors 102 and 104 (and any other image sensors), image data stored in the storage 108, image data received from a remote source (e.g., a remote camera, a server, a content provider, any combination thereof, and/or other remote source), image data obtained from a combination of sources, any combination thereof, and/or other image data.

In some examples, the modeling engine 122 can be part of or implemented by the image processing engine 120. In other examples, the modeling engine 122 can be separate from (e.g., not part of or implemented by) the image processing engine 120. In some cases, the modeling engine 122 can include (e.g., can implement, can contain, can generate etc.) one or more models. For example, in some cases, the modeling engine 122 can include and/or implement one or more skinning models. An illustrative example of a skinning model includes a hand model with articulated and non-rigid deformations or MANO model, as described in Javier Romero et al., "Embodied Hands: Modeling and Capturing Hands and Bodies Together", *ACM Transactions on Graphics*, Vol. 36, No. 6, Article 245 (November 2017), which is hereby incorporated by reference in its entirety and for all purposes. In some examples, the modeling engine 122 can generate skinned models and parametric meshes, as further described herein. In some examples, the modeling engine 122 can implement any other models, such as any type of statistical models, neural network models, etc.

In some cases, the modeling engine 122 can include and/or implement a transformation system, an optimizer, and/or one or more models, as described herein. In some examples, the rendering engine 124 can receive output image data from the computing components 110 and render the output image data for presentation on a display device such as, for example, a screen/display, a television, a projector, etc. In some examples, the rendering engine 124 can receive generated images and/or mesh models from the image processing engine 120 and/or the modeling engine 122 and render the images and/or mesh models.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 8.

As previously noted, the image processing system 100 can estimate real-world depth information about an object captured in multiple images having different views (e.g., different reference frames or coordinate systems) and/or images captured by multiple image capturing devices having different views. The image processing system 100 can use the images with the different views to estimate the real-world depth information about the object. For example, 3D points in the reference frames of multiple image capturing devices (e.g., image sensors 102 and 104) can have a linear relationship. In some cases, the image processing system 100 can implement a linear equation which can use the linear relationship of the image capturing devices to guide or perform a coordinate transformation. The image processing system 100 can use the linear relationship (and linear equation) to estimate and/or refine depth information from the images captured by the multiple image capturing devices.

Figure 2:
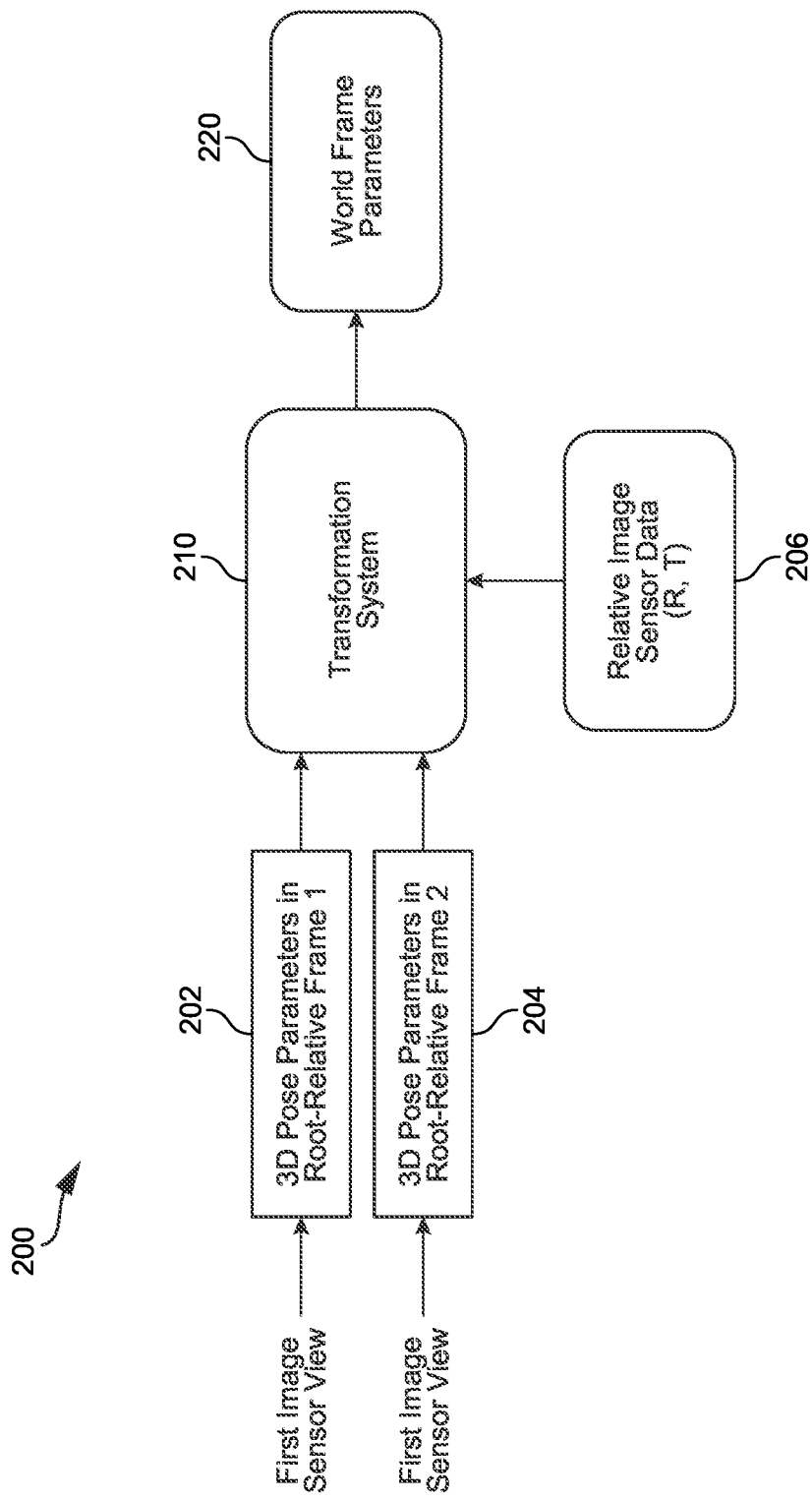
FIG. 2 is a diagram illustrating an example system process for estimating depth information for a real-world frame, in accordance with some examples of the present disclosure.

FIG. 2 is a diagram illustrating an example system process 200 for estimating depth information for a real-world frame (e.g., a real-world coordinate system in a scene). In this example, a transformation system 210 can obtain 3D pose parameters 202 in a first root-relative frame (e.g., a first root-relative coordinate system) and 3D pose parameters 204 in a second root-relative frame (e.g., a second root-relative coordinate system). The 3D pose parameters 202 can correspond to an object captured by an image sensor (e.g., image sensor 102) in a first view/frame, and the 3D pose parameters 202 can correspond to the object captured by another image sensor (e.g., image sensor 104) in a second view/frame. In some examples, the object can include an articulated object.

As previously noted, a root-relative frame can include a normalized reference frame where 3D coordinates of an object are given as (x, y, $z_{rel}$), where $Z_{rel}$ is a relative depth such that a centroid of the object is placed at z=0 (e.g., the depth of the centroid of the object equals 0). In some examples, the first root-relative frame associated with the 3D pose parameters 202 can be a 3D frame having x, y, z dimensions denoted as $x_1$, $y_1$, and $z_{rel1}$, where $z_{rel1}$ describes a depth relative to a root of the object in frame 1 (or relative to a depth of a root of the object). The second root-relative frame associated with the 3D pose parameters 202 can be a 3D frame having x, y, z dimensions denoted as $x_2$, $y_2$, and $Z_{rel2}$, where $z_{rel2}$ describes a depth relative to a root of the object in frame 2 (or relative to a depth of a root of the object).

The transformation system 210 can also obtain relative image sensor data 206. The relative image sensor data 206 can include information about the image capturing devices (e.g., image sensors 102 and 104) that captured the image data associated with the 3D pose parameters 202 and 204. For example, the relative image sensor data 206 can include relative rotation and translation parameters for the image capturing devices that captured the image data associated with the 3D pose parameters 202 and 204. In some examples, the relative rotation and translation parameters can be based on respective rotation and translation parameters of the image capturing devices.

To illustrate, the 3D pose parameters 202 can correspond to an object in an image captured by image sensor 102 from a first coordinate frame, and the 3D parameters 204 can correspond to the object in another image captured by image sensor 104 from a second coordinate frame. The 3D pose parameters 202 and 204 can capture a pose of the object from different coordinate frames. The relative image sensor data 206 can include relative rotation and translation parameters for the image sensor 102 and the image sensor 104. The relative rotation and translation parameters can be based on rotation and translation parameters of the image sensor 102 and rotation and translation parameters of the image sensor 104. In some examples, the relative rotation and translation parameters can describe the relative positions or poses of the image sensors 102 and 104.

The transformation system 210 can use the 3D pose parameters 202 and 204 and the relative image sensor data 206 to estimate real-world frame parameters 220. The real-world frame parameters 220 can include depth information in a real-world coordinate frame estimated from root-relative depth information in the first coordinate frame associated with the 3D pose parameters 202 and the second coordinate frame associated with the 3D pose parameters 204.

In some examples, the transformation system 210 can determine real-world 3D coordinates x, y, $z_{world}$ based on the relative image sensor data 206, the $x_1$, $y_1$, and $z_{rel1}$ coordinates associated with the 3D pose parameters 202 (and the first coordinate frame), and the $x_2$, $y_2$, and $z_{rel2}$ coordinates associated with the 3D pose parameters 204 (and the second coordinate frame). The transformation system 210 can use a linear relationship of the location/geometry of the image capturing devices that captured the image data associated with the 3D pose parameters 202 and 204 (e.g., image sensors 102 and 104), to perform a coordinate transformation and determine the real-world 3D coordinates x, y, $z_{world}$.

In some cases, the transformation system 210 can implement a linear equation to determine the real-world 3D coordinates x, y, $z_{world}$. In some examples, the transformation system 210 can determine a depth (e.g., $z_{world}$) of $z_{rel1}$ and $Z_{rel2}$ in a real-world coordinate frame as described in the following equation:

$$\begin{bmatrix} x_1 \\ y_1 \\ z_1 \\ 1 \end{bmatrix} = \begin{bmatrix} R & T \\ 0 & 1 \end{bmatrix} \begin{bmatrix} x_2 \\ y_2 \\ z_2 \\ 1 \end{bmatrix} \quad \text{Equation (1)}$$

where R and T denote the relative rotation and translation of the image capturing devices that captured the image data associated with the 3D pose parameters 202 and 204 (e.g., image sensors 102 and 104), $z_1$ corresponds to $z_{rel1}$ and $z_2$ corresponds to $Z_{rel2}$. In some examples, the transformation system 210 can solve for $z_1$ and $z_2$ as follows:

$$\begin{bmatrix} x_1 \\ y_1 \\ z_1 \\ 1 \end{bmatrix} = \begin{bmatrix} R1 & R2 & R3 & T1 \\ R4 & R5 & R6 & T2 \\ R7 & R8 & R9 & T3 \\ 0 & 0 & 0 & 1 \end{bmatrix} \begin{bmatrix} x_2 \\ y_2 \\ z_2 \\ 1 \end{bmatrix} \quad \text{Equation (2)}$$

$$\begin{bmatrix} x_1 \\ y_1 \\ z_1 \\ 1 \end{bmatrix} = \begin{bmatrix} R1.x2 + R2.y2 + R3.z2 + T1.1 \\ R4.x2 + R5.y2 + R6.z2 + T2.1 \\ R7.x2 + R8.y2 + R9.z2 + T3.1 \\ 0 \quad 0 \quad 0 \quad 1 \end{bmatrix} \begin{bmatrix} x_2 \\ y_2 \\ z_2 \\ 1 \end{bmatrix} \quad \text{Equation (3)}$$

$$z_2 = \frac{(x1 - R1.x2 + r2.y2 + T1.1)}{R3} z_1 = \quad \text{Equation (4)}$$

$$R7.x2 + R8.y2 + R9.z2 + T3.1$$

Figure 3:
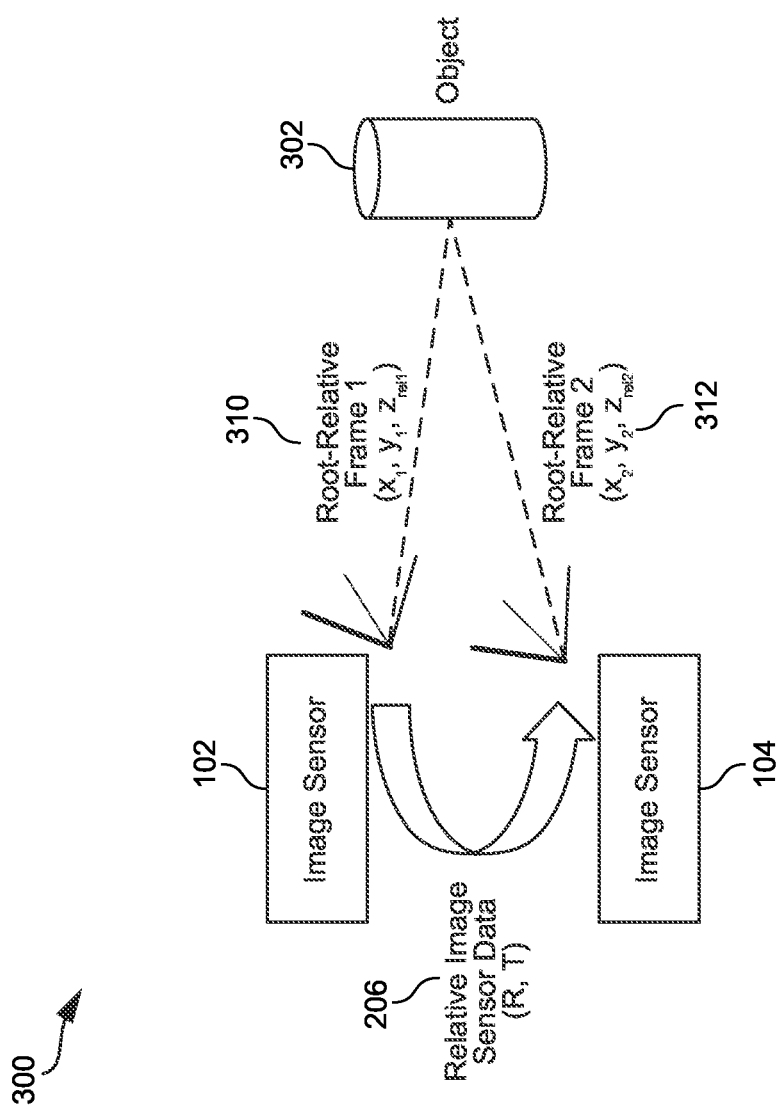
FIG. 3 is a diagram illustrating an example multi-view image sensor setup for capturing images of an object from multiple coordinate reference frames, in accordance with some examples of the present disclosure.

FIG. 3 is a diagram illustrating an example multi-view image sensor setup 300 for capturing images of an object 302 from multiple coordinate reference frames. In this example, the image sensors 102 and 104 can capture images of the object 302 from their respective locations. The images can have different reference frames based on the locations of the image sensors 102 and 104. The images can be used to determine a root-relative frame 310 associated with the object 302 (and/or the image of the object 302) from the perspective of image sensor 102 and a root-relative frame 312 associated with the object 302 (and/or the image of the object 302) from the perspective of image sensor 104.

The relative image sensor data 206 can include the relative rotations and translations of the image sensors 102 and 104 given their respective positions or poses. The relative image sensor data 206 and the root-relative frames 310 and 312 can allow the transformation system 210 to estimate depth information for the object 302 with respect to a real-world coordinate frame. In some examples, the transformation system 210 can determine the real-world depth information using any of Equations 1 through 4 above.

Figure 4:
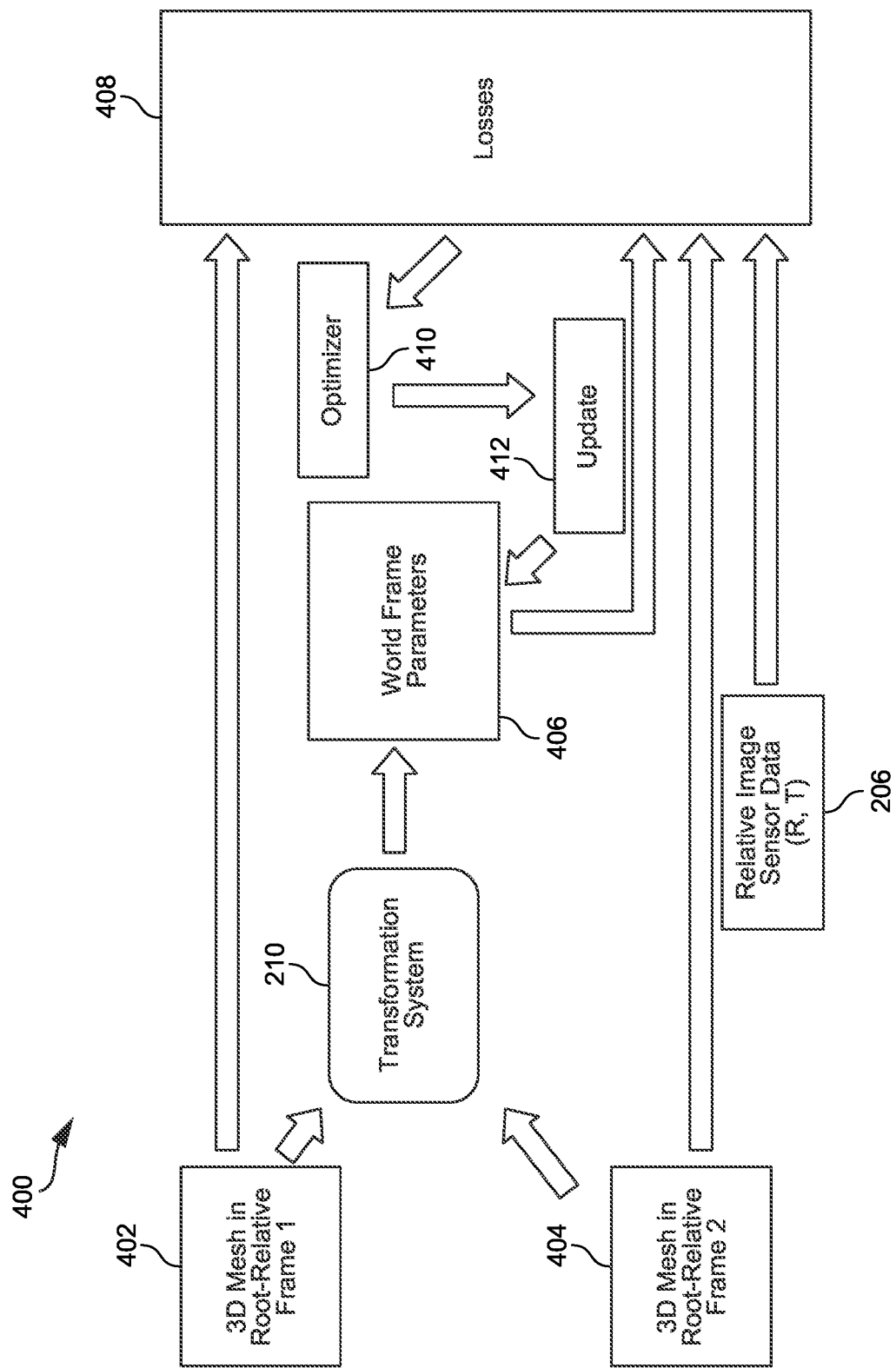
FIG. 4 is a diagram illustrating an example optimization framework for optimizing real-world frame mesh parameters determined for an object from multi-view image data, in accordance with some examples of the present disclosure.

FIG. 4 is a diagram illustrating an example optimization framework 400 for optimizing real-world frame mesh parameters (e.g., mesh parameters in a real-world coordinate reference frame) determined for an object from multi-view image data (e.g., images with multiple coordinate reference frames). In this example, the transformation system 210 can determine real-world frame parameters 406 for the 3D mesh 402 in a first root-relative frame and 3D mesh 404 in a second root-relative frame. The transformation system 210 can determine the real-world frame parameters 406 based on the 3D mesh 402, the 3D mesh 404.

In some examples, the 3D mesh 402 and the 3D mesh 404 can include 3D mesh parameters for an object. The 3D mesh parameters in the 3D mesh 402 can correspond to a first root-relative frame, and the 3D mesh parameters in the 3D mesh 404 can correspond to a second root-relative frame. The 3D mesh parameters can include, for example, rotation parameters and texture parameters of keypoints in respective root-relative frames (e.g., $x_1$, $y_1$, and $z_{rel1}$ and $x_2$, $y_2$, and $Z_{rel2}$), and respective rotation and translation parameters associated with the capturing devices (e.g., image sensors 102 and 104) that captured the images used to calculate the 3D mesh parameters. In some cases, the texture parameters can describe a texture of the object, such as a texture of a skin or surface of the object.

In some examples, the rotation parameters in the 3D mesh 402 can include rotations of points in the 3D mesh, relative to a parent joint in the 3D mesh. For example, child points in a 3D mesh can be connected to a parent joint. The rotation parameters can include the rotation of each child point relative to its parent joint. The rotation parameters in the 3D mesh 402 can also include rotation parameters corresponding to the capturing device (e.g., image sensor 102) that captured the image used to calculate the 3D mesh 402. The rotation parameters can be based on a reference frame of the capturing device and/or relative to a capturing device that captured the image used to calculate the 3D mesh 404.

Similarly, in some examples, the rotation parameters in the 3D mesh 404 can include rotations of points in the 3D mesh, relative to a parent joint in the 3D mesh. The rotation parameters can include the rotation of each child point relative to its parent joint. The rotation parameters in the 3D mesh 404 can also include rotation parameters corresponding to the capturing device (e.g., image sensor 104) that captured the image used to calculate the 3D mesh 404. The rotation parameters can be based on a reference frame of the capturing device and/or relative to a capturing device that captured the image used to calculate the 3D mesh 402.

The real-world frame parameters 406 can include mesh parameters in a real-world frame. The mesh parameters can be generated based on the 3D meshes 402 and 404. The real-world frame can be estimated based on the first and second root-relative frames associated with the 3D meshes 402 and 404, as previously described. In some examples, mesh parameters in the real-world frame parameters 406 can include rotation and texture parameters in the real-world frame. The rotation and texture parameters can include relative rotations and textures of keypoints in the mesh in the real-world frame. In some cases, the real-world frame parameters 406 can also include rotation and translation information for a 3D mesh associated with the mesh parameters. The rotation and translation information can be in the real-world frame.

An optimizer 410 can use the 3D meshes 402 and 404, the real-world frame parameters 406, and the relative image sensor data 206 to determine one or more losses 408 for the real-world frame parameters 406. The one or more losses 408 can be used to optimize the real-world frame parameters 406 to better fit the 3D meshes 402 and 404. For example, the optimizer 410 can use the one or more losses 408 as feedback to update 412 the real-world frame parameters 406.

In some examples, the optimizer 410 can determine the one or more losses 408 based on a distance between parameters in the 3D meshes 402 and 404. In some cases, the optimizer 410 (or a model associated with the optimizer 410) can project the real-world frame parameters 406 onto the 3D meshes 402 and 404 and/or the coordinate frames associated with the 3D meshes 402 and 404, and determine the one or more losses 408 based on a distance between the projected real-world frame parameters 406 and/or the 3D meshes 402 and 404. For example, in some cases, a model can transform the real-world frame parameters 406 to 3D meshes in the coordinate frames associated with the 3D meshes 402 and 404. The optimizer 410 can determine the one or more losses 408 based on a distance between the transformed 3D meshes in the coordinate frames. In some cases, the transformed 3D meshes can be aligned with the 3D meshes 402 and 404 prior to determining the one or more losses 408.

In some examples, the updated real-world frame parameters can be used to generate a refined 3D mesh model for the object captured in the images associated with the 3D meshes 402 and 404. The 3D mesh model can be generated in the real-world frame. In some examples, the 3D mesh model can be fit with the image data associated with the 3D meshes 402 and 404 and/or with the 3D meshes 402 and 404.

Figure 5:
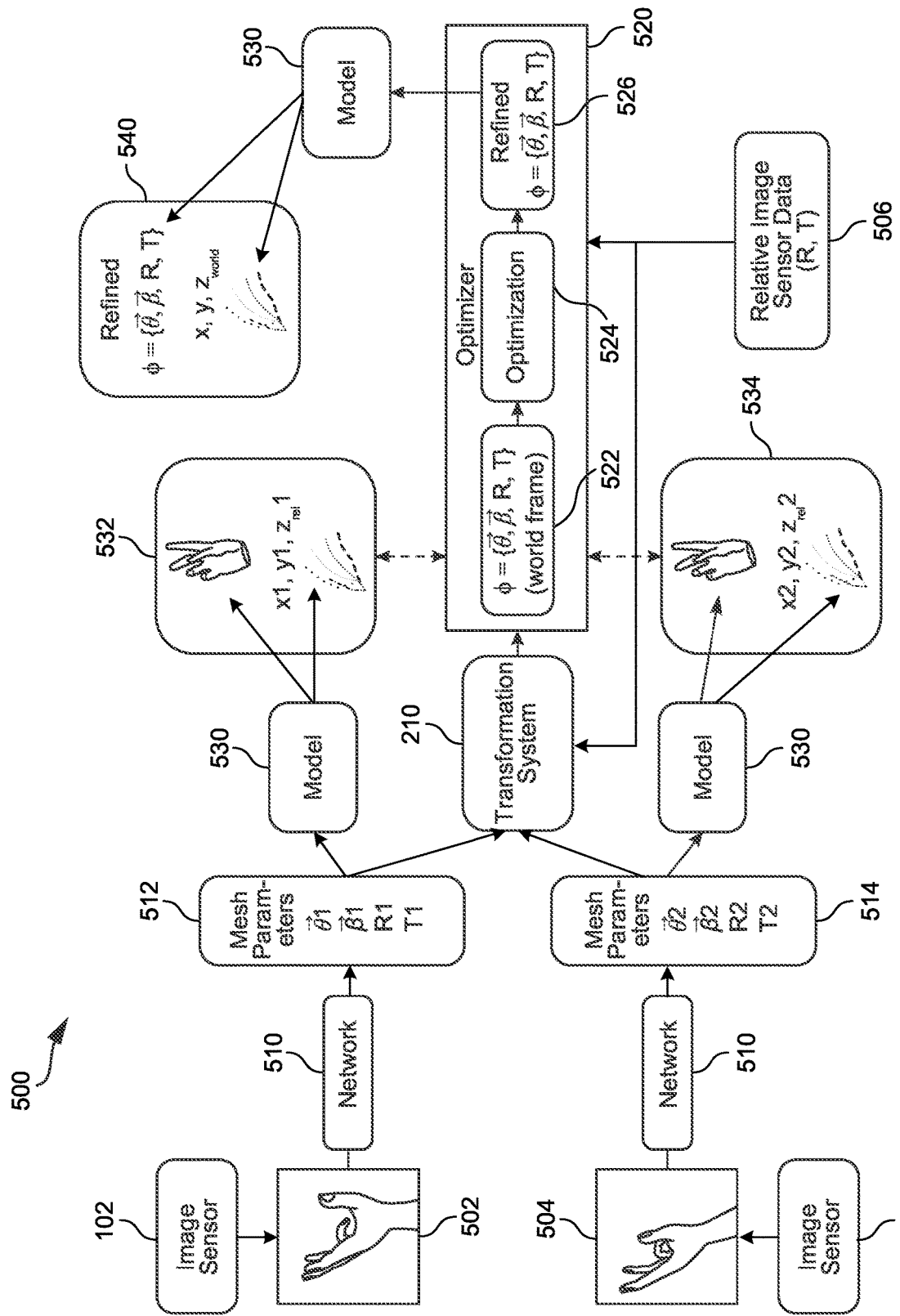
FIG. 5 is a diagram illustrating an example 3D modeling use case, in accordance with some examples of the present disclosure.

FIG. 5 is a diagram illustrating an example 3D modeling use case 500. The example 3D modeling use case 500 in FIG. 5 involves 3D modeling of parametric meshes of a hand from multiple images 502 and 504 with different views (e.g., different reference frames). The images 502 and 504 can be captured by image sensors 102 and 104 from different positions.

As shown, a network 510 can process the images 502 and 504 to generate mesh parameters 512 and 514 for a parametric mesh of the hand captured in the images 502 and 504. The mesh parameters 512 and 514 can be for/from different coordinate frames. For example, the mesh parameters 512 can be for a coordinate frame associated with image 502, and the mesh parameters 514 can be for/from a coordinate frame associated with image 504.

The network 510 can include one or more networks. In some examples, the network 510 can include one or more neural networks. For example, the network 510 can include an encoder network. In some cases, the network 510 can include a convolutional neural network (CNN) encoder model. In other cases, the network 510 can include any other neural network architecture. The network 510 can be configured to receive input images (e.g., input images 502 and 504) with different views (e.g., different coordinate frames) and generate mesh parameters for different coordinate frames associated with the input images. The mesh parameters can correspond to an object captured in the input images.

The mesh parameters 512 can include rotation and texture parameters in a root-relative frame associated with image 502. The mesh parameters 512 can also include rotation and translation parameters associated with image sensor 102. In some examples, the mesh parameters 512 can include relative rotations ($\vec{\theta}_1$) and textures ($\vec{\beta}_1$) of keypoints corresponding to a parametric mesh of the hand in the image 502, a rotation ($R_1$) of image sensor 102, and a translation ($T_1$) of image sensor 102. In some examples, the relative rotations ($\vec{\theta}_1$) can include rotations of child keypoints relative to a parent joint the child keypoints are connected to or extend from.

Similarly, the mesh parameters 514 can include rotation and texture parameters in a root-relative frame associated with image 504. The mesh parameters 514 can also include rotation and translation parameters associated with image sensor 104. In some examples, the mesh parameters 514 can include relative rotations ($\vec{\theta}_2$) and textures ($\vec{\beta}_2$) of keypoints corresponding to a parametric mesh of the hand in the image 504, a rotation ($R_2$) of image sensor 104, and a translation ($T_2$) of image sensor 104.

The transformation system 210 can use the mesh parameters 512 and the mesh parameters 514 to determine a real-world coordinate frame and generate mesh parameters 522 for the real-world coordinate frame. In some examples, the mesh parameters 522 can include rotations ($\vec{\theta}$) and textures ($\vec{\beta}$) of keypoints in the real-world coordinate frame, a relative rotation (R) of the image sensors 102 and 104, and a relative translation (T) of the image sensors 102 and 104.

An optimizer 520 can receive the mesh parameters 512 from the transformation system 210 and perform an optimization 524 of the mesh parameters 512 to generate refined mesh parameters 526. The optimizer 520 can be a first or second order optimizer. In some examples, the optimizer 520 can implement an iterative method for solving unconstrained nonlinear optimization problems. For example, the optimizer 520 can implement a Broyden-Fletcher-Goldfarb-Shanno (BFGS) algorithm or a limited-memory BFGS (L-BFGS) algorithm.

In the optimization 524, the optimizer 520 can determine one or more losses based on the mesh parameters 512 for the real-world coordinate frame, the mesh parameters 512 for the root-relative coordinate frame associated with the image 502, the mesh parameters 514 for the root-relative coordinate frame associated with the image 504, and relative image sensor data 506 associated with the image sensors 102 and 104. The relative image sensor data 506 can identify the positions of the image sensors 102 and 104 relative to each other. For example, the relative image sensor data 506 can include a relative rotation and translation of the image sensors 102 and 104.

In some examples, the optimizer 520 can determine a loss based on a distance and/or difference between a 3D mesh corresponding to the mesh parameters 512 and a 3D mesh corresponding to the mesh parameters 512 as well as a distance and/or difference between the 3D mesh corresponding to the mesh parameters 512 and a 3D mesh corresponding to the mesh parameters 514. In some cases, a model 530 (e.g., a skinning model such as the MANO model noted above) can generate a 3D mesh 532 based on the mesh parameters 512, a 3D mesh 534 based on the mesh parameters 514, and a 3D mesh based on the mesh parameters 522. In some examples, the model 530 can transform a 3D mesh corresponding to the mesh parameters 514 to a first 3D mesh in a coordinate frame associated with the image 502 (and/or the image sensor 102) and a second 3D mesh in a coordinate frame associated with the image 504 (and/or the image sensor 102). The optimizer 520 can calculate a loss between the first and second 3D meshes, and use the loss to refine the mesh parameters 522.

As previously noted, in some cases, the model 530 can generate a 3D mesh 532, a 3D mesh 534, and a 3D mesh associated with the mesh parameters 522. The 3D mesh 532 can correspond to a first coordinate frame associated with the image 502, the 3D mesh 534 can correspond to a second coordinate frame associated with the image 504, and the 3D mesh associated with the mesh parameters 522 can correspond to the real-world coordinate frame. The optimizer 520 can determine a loss based on the 3D mesh 532 associated with the mesh parameters 512, the 3D mesh 534 associated with the mesh parameters 514, and/or the 3D mesh associated with the mesh parameters 522, and use the loss to determine the refined mesh parameters 526.

In some examples, the optimizer 520 can generate the refined mesh parameters 526 as follows:

$$\text{loss} = \|f_1(\text{Mesh}(\phi)) - \text{Mesh}(\phi_1)\|_2^2 + \lambda \|f_2(\text{Mesh}(\phi)) - \text{Mesh}(\phi_2)\|_2^2) \quad \text{Equation (5)}$$

where f refers to a function which converts image sensor-relative 3D coordinates to root-relative coordinates for the $i^{th}$ image sensor origin using the relative image sensor data 506 associated with image sensors 102 and 104, $\phi$ are the mesh parameters 522 (e.g., mesh parameters for the real-world coordinate frame), $\phi_1$ are the mesh parameters 512 (e.g., mesh parameters for a first coordinate reference frame), $\phi_2$ are the mesh parameters 514 (e.g., mesh parameters for a second coordinate reference frame), Mesh($\phi$) provides a 3D mesh from the mesh parameters $\phi$, Mesh($\phi_1$) provides a 3D mesh from the mesh parameters $\phi_1$, Mesh($\phi_2$) provides a 3D mesh from the mesh parameters $\phi_2$, and $\lambda$ is a weight for loss terms across multiple coordinate frames.

The optimizer 520 can output the refined mesh parameters 526 to the model 530. The model 530 can generate a 3D mesh 540 of the hand in the images 502 and 504 based on the refined mesh parameters 526. The 3D mesh 540 can include a parametric model of the hand for the real-world coordinate frame.

Figure 6:
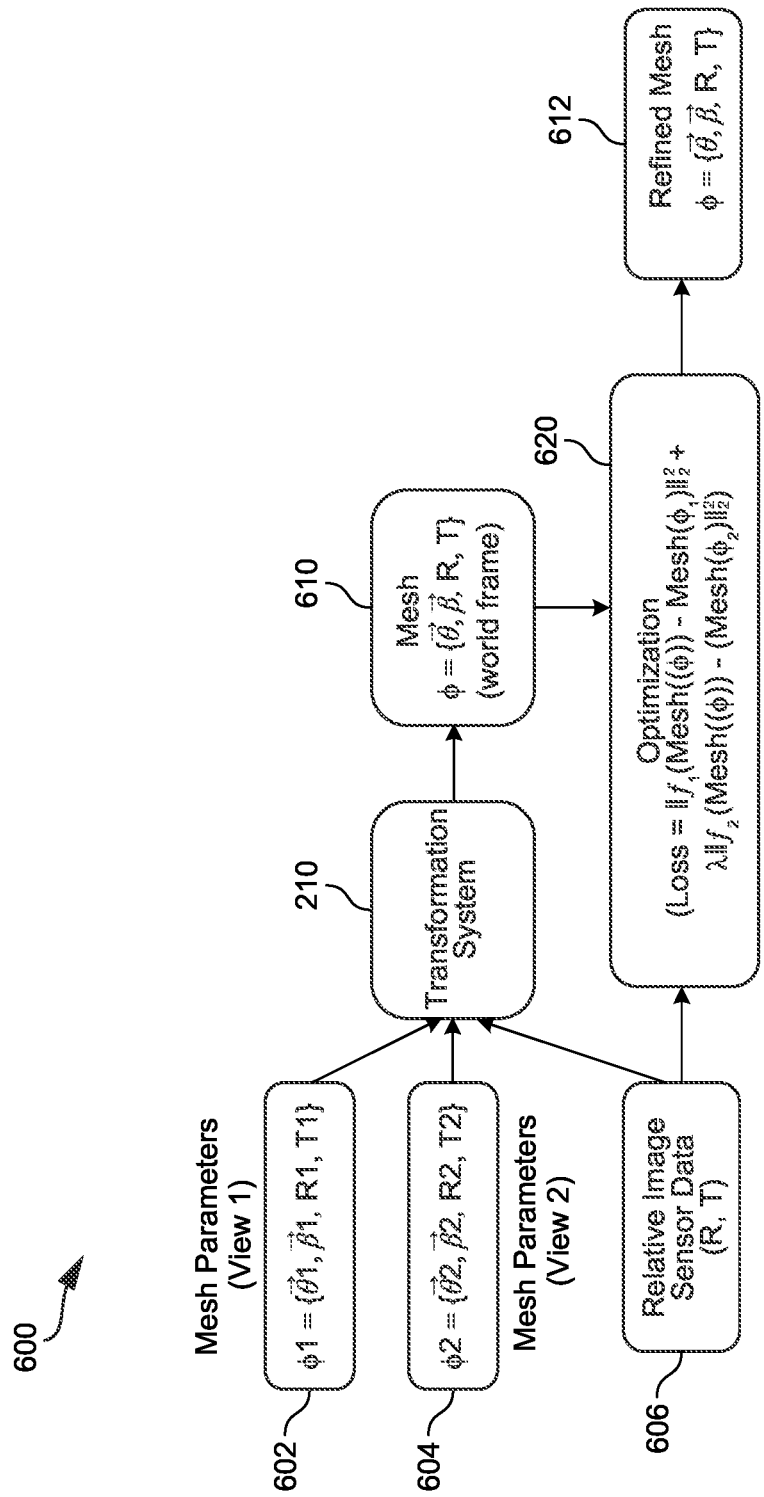
FIG. 6 is a diagram illustrating an example optimization process for generating refined mesh parameters for a real-world coordinate frame, in accordance with some examples of the present disclosure.

FIG. 6 is a diagram illustrating an example optimization process 600 for generating refined mesh parameters for a real-world coordinate frame. As shown, the transformation system 210 can generate mesh parameters ($\phi$) 610 for a real-world coordinate frame based on mesh parameters ($\phi_1$) 602 generated from a first image view (e.g., a first reference coordinate frame), mesh parameters ($\phi_2$) 604 generated from a second image view (e.g., a second reference coordinate frame), and relative image sensor data 606 for the image sensors (e.g., image sensors 102 and 104) that captured the images used to generate the mesh parameters 602 and 604.

The mesh parameters 602 can include rotations ($\vec{\theta}_1$) of pose and textures ($\vec{\beta}_1$) for the surface of a mesh for the first image view (e.g., first reference coordinate frame), a rotation ($R_1$) of the image sensor that captured the image used to generate the mesh parameters 602, and a translation ($T_1$) of the image sensor. The mesh parameters 604 can include rotations ($\vec{\theta}_2$) of pose and textures ($\vec{\beta}_2$) for the surface of a mesh for the second image view (e.g., second reference coordinate frame), a rotation ($R_2$) of the image sensor that captured the image used to generate the mesh parameters 604, and a translation ($T_2$) of the image sensor. The relative image sensor data 606 can include a relative rotation and translation for the image sensors that captured the images used to generate the mesh parameters 602 and 604.

The mesh parameters 610 can include rotations ($\vec{\theta}$) of pose and textures ($\vec{\beta}$) for the surface of a mesh for the real-world coordinate frame, a relative rotation (R) of the image sensors that captured the images used to generate the mesh parameters 602 and 604, and a relative translation (T) of the image sensors. An optimization 620 can be performed using the mesh parameters 610 and the relative image sensor data 606 to generate refined mesh parameters 612.

In this example, the optimization 620 can generate a loss based on Equation 5 described above. The optimization 620 can use the loss as feedback to generate the refined mesh parameters 612. In some examples, the refined mesh parameters 612 can update/optimize the rotations ($\vec{\theta}$), textures ($\vec{\beta}$), relative rotation (R), and/or relative translation (T) in the mesh parameters 610 to provide a better or more accurate 3D fitting over the mesh parameters 602 and 604.

Figure 7:
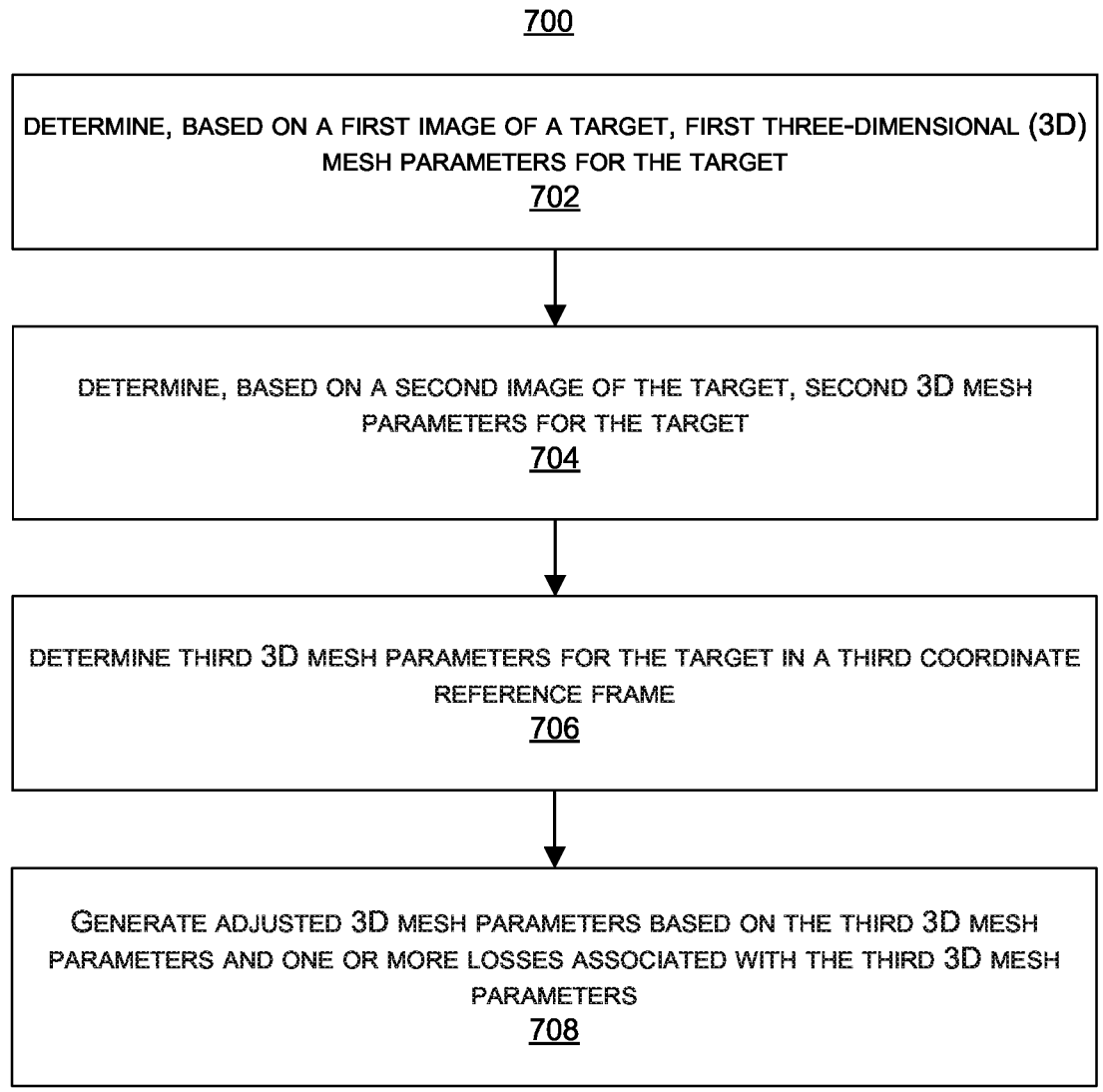
FIG. 7 is a flowchart illustrating an example process for modeling 3D parametric meshes using multi-view image data, in accordance with some examples of the present disclosure.

FIG. 7 is a flowchart illustrating an example process 700 for modeling 3D parametric meshes using multi-view image data. At block 702, the process 700 can include determining, based on a first image (e.g., image 502) of a target, first 3D mesh parameters (e.g., 3D mesh 402 or mesh parameters 512 or 602) for the target. The first 3D mesh parameters can correspond to a first coordinate reference frame associated with the first image. In some examples, the first coordinate reference frame can depend on a view of the first image.

At block 704, the process 700 can include determining, based on a second image (e.g., image 504) of the target, second 3D mesh parameters (e.g., 3D mesh 404 or mesh parameters 514 or 604) for the target. The second 3D mesh parameters can correspond to a second coordinate reference frame associated with the second image. In some examples, the second coordinate reference frame can depend on a view of the second image.

In some examples, determining the first 3D mesh parameters and the second 3D mesh parameters can include determining a first root-relative pose of the target in the first image and a second root-relative pose of the target in the second image. In some cases, the first 3D mesh parameters can include the first root-relative pose and the second 3D mesh parameters can include the second root-relative pose.

In some cases, the first image and the second image can include monocular images. In some examples, the first image and the second image can be captured by image sensors having different views to the target. For example, the first and second image can be captured by image sensors having different positions relative to the target.

At block 706, the process 700 can include determining third 3D mesh parameters (e.g., mesh parameters 406, 522, or 610) for the target in a third coordinate reference frame. The third 3D mesh parameters can be based on the first 3D mesh parameters, the second 3D mesh parameters, and relative rotation and translation parameters (e.g., relative image sensor data 206, 506, or 606) of a first image sensor (e.g., image sensor 102) that captured the first image and a second image sensor (e.g., image sensor 104) that captured the second image. The first image sensor and the second image sensor can have different poses/positions relative to the target. The different poses/positions of the first and second image sensors can result in the first and second images having different views of the target (e.g., views in different coordinate frames).

In some examples, the first coordinate reference frame can include a first root-relative frame, the second coordinate reference frame can include a second root-relative frame, and the third coordinate reference frame can include a real-world coordinate frame in a scene associated with the first image and the second image.

In some cases, determining the third 3D mesh parameters can include converting 3D coordinates in the first root-relative frame and the second root-relative frame (e.g., $x_1$, $y_1$, and $z_{rel1}$ and $x_2$, $y_2$, and $z_{rel2}$) to 3D coordinates in the real-world coordinate frame (e.g., x, y, and $z_{world}$), and determining the third 3D mesh parameters based on the 3D coordinates in the real-world coordinate frame. In some examples, the third 3D mesh parameters can model the target in the real-world coordinate frame.

In some cases, the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

In some examples, converting 3D coordinates in the first root-relative frame and the second root-relative frame to 3D coordinates in the real-world coordinate frame can include converting depth coordinates from the 3D coordinates in the first root-relative frame and the second root-relative frame to different depth coordinates in the real-world coordinate frame. In some cases, the depth coordinates can be converted to the different depth coordinates based on the relative rotation and translation parameters and a relationship between coordinates in the 3D coordinates.

In some cases, the third 3D mesh parameters can be determined using any of Equations 1 to 4 described above.

At block 708, the process 700 can include determining adjusted 3D mesh parameters (e.g., refined mesh parameters 526 or 612) based on the third 3D mesh parameters and one or more losses (e.g., losses 408) associated with the third 3D mesh parameters. The adjusted 3D mesh parameters can include one or more adjustments (e.g., update 412) to the third 3D mesh parameters. In some aspects, the process 700 can include generating a 3D mesh model based on the adjusted 3D mesh parameters.

In some cases, the process 700 can include determining one or more losses (e.g., losses 408) associated with the third 3D mesh parameters. The one or more losses can be based on the first 3D mesh parameters, the second 3D mesh parameters, and the relative rotation and translation parameters. In some cases, the one or more losses can be determined based on Equation 5 described above. In some examples, the one or more losses can be determined based on observations and/or outputs from one or more neural networks.

In some cases, determining the one or more losses can include transforming the third 3D mesh parameters to the first coordinate reference frame and the second coordinate reference frame, and aligning the third 3D mesh parameters with root-relative coordinates associated with the first 3D mesh parameters and the second 3D mesh parameters. In some examples, the third 3D mesh parameters can be aligned with the root-relative coordinates by subtracting a depth of root associated with the root-relative coordinates. In some examples, the one or more losses can be determined based on the alignment.

In some cases, the one or more losses can be determined based on the second 3D mesh and the third 3D mesh. In some examples, the one or more losses are calculated based on a least square errors function. In some cases, determining the adjusted 3D mesh parameters can include minimizing an error in the third 3D mesh parameters based on the least square errors function.

In some cases, determining the one or more losses can include generating, based on the third 3D mesh parameters and the relative rotation and translation parameters of the first image sensor and the second image sensor, a first 3D mesh in the first coordinate reference frame and a second 3D mesh in the second coordinate reference frame.

In some examples, the target can include an articulated object. For example, the target can include a human body, an animal body, a body part (e.g., a hand, a head, etc.), a manipulator robot, etc. In some cases, the 3D mesh model can include a skinned model.

In some examples, the processes described herein (e.g., processes 200, 600, 700, and/or any other process described herein) may be performed by a computing device or apparatus. In one example, the process 700 can be performed by the image processing system 100 of FIG. 1. In another example, the process 700 can be performed by the computing system having the computing device architecture 800 shown in FIG. 8. For instance, a computing device with the computing device architecture 800 shown in FIG. 8 can implement the operations of FIG. 7 and/or the components and/or operations described herein with respect to any of FIGS. 1 through 7.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the processes 200, 700, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200, 600, and 700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 200, 600, and 700, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
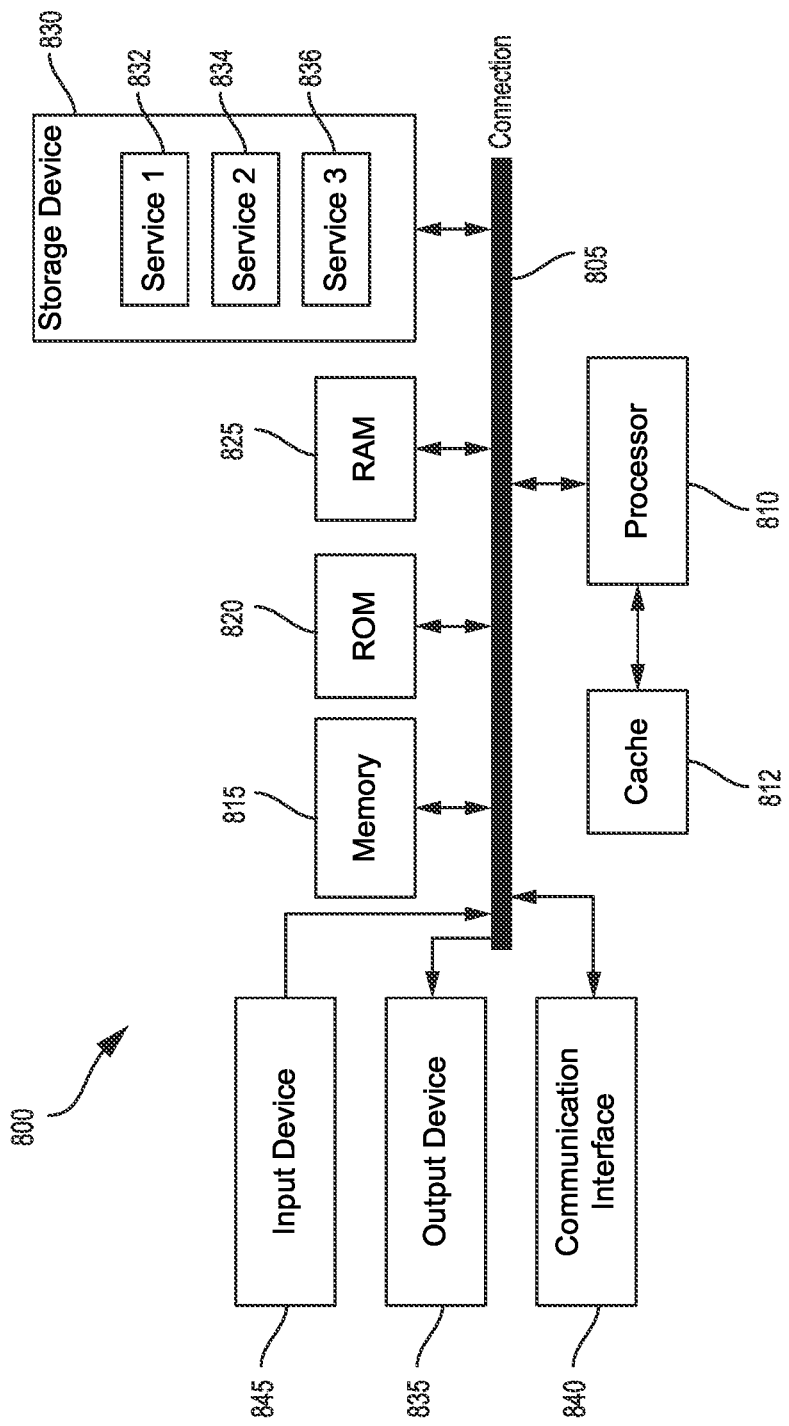
FIG. 8 is a diagram illustrating an example system architecture for implementing certain aspects described herein.

FIG. 8 illustrates an example computing device architecture 800 of an example computing device which can implement various techniques described herein. For example, the computing device architecture 800 can implement at least some portions of the image processing system 100 shown in FIG. 1. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions.

Other computing device memory 815 may be available for use as well. The memory 815 can include multiple different types of memory with different performance characteristics. The processor 810 can include any general purpose processor and a hardware or software service (e.g., service 1 832, service 2 834, and service 3 836) stored in storage device 830 and configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include service 832, service 834, and service 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A apparatus comprising memory and one or more processors coupled to the memory. The one or more processors are configured to: determine, based on a first image of a target, first three-dimensional (3D) mesh parameters for the target, wherein the first 3D mesh parameters correspond to a first coordinate reference frame associated with the first image; determine, based on a second image of the target, second 3D mesh parameters for the target, wherein the second 3D mesh parameters correspond to a second coordinate reference frame associated with the second image; determine third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and generate adjusted 3D mesh parameters based on the third 3D mesh parameters and one or more losses associated with the third 3D mesh parameters, the adjusted 3D mesh parameters comprising one or more adjustments to the third 3D mesh parameters.

Aspect 2. The apparatus of aspect 1, wherein the first coordinate reference frame comprises a first root-relative frame and the second coordinate reference frame comprises a second root-relative frame, and wherein the third coordinate reference frame comprises a real-world coordinate frame in a scene associated with the first image and the second image.

Aspect 3. The apparatus of aspect 2, wherein, to determine the third 3D mesh parameters, the one or more processors are configured to: convert 3D coordinates in the first root-relative frame and the second root-relative frame to 3D coordinates in the real-world coordinate frame; and determine the third 3D mesh parameters based on the 3D coordinates in the real-world coordinate frame, the third 3D mesh parameters modeling the target in the real-world coordinate frame.

Aspect 4. The apparatus of aspect 3, wherein the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

Aspect 5. The apparatus of any one of aspects 1 to 4, wherein, to determine the first 3D mesh parameters and the second 3D mesh parameters, the one or more processors are configured to: determine a first root-relative pose of the target in the first image and a second root-relative pose of the target in the second image, wherein the first 3D mesh parameters comprise the first root-relative pose and the second 3D mesh parameters comprise the second root-relative pose.

Aspect 6. The apparatus of any one of aspects 1 to 5, wherein the one or more processors are configured to: transform the third 3D mesh parameters to the first coordinate reference frame and the second coordinate reference frame; and align the third 3D mesh parameters with root-relative coordinates associated with the first 3D mesh parameters and the second 3D mesh parameters.

Aspect 7. The apparatus of aspect 6, wherein the third 3D mesh parameters are aligned with the root-relative coordinates by subtracting a depth of root associated with the root-relative estimates associated with the first 3D mesh parameters and the second 3D mesh parameters.

Aspect 8. The apparatus of any one of aspects 6 or 7, wherein the one or more processors are configured to: determine the one or more losses based on the second 3D mesh and the third 3D mesh, the one or more losses comprising a loss between the second 3D mesh and the third 3D mesh.

Aspect 9. The apparatus of any one of aspects 1 to 8, wherein the one or more losses are calculated based on a least square errors function, and wherein, to determine adjusted 3D mesh parameters, the one or more processors are configured to minimize an error in the third 3D mesh parameters based on the least square errors function.

Aspect 10. The apparatus of any one of aspects 1 to 9, wherein, to determine one or more losses, the one or more processors are configured to: generate, based on the third 3D mesh parameters and the relative rotation and translation parameters, a first 3D mesh in the first coordinate reference frame and a second 3D mesh in the second coordinate reference frame.

Aspect 11. The apparatus of any one of aspects 1 to 10, wherein the one or more processors are configured to generate a 3D mesh model based on the adjusted 3D mesh parameters.

Aspect 12. The apparatus of any one of aspects 1 to 11, wherein the target comprises an articulated object and the 3D mesh model comprises a skinned model, and wherein the first image and the second image comprise monocular images.

Aspect 13. The apparatus of any one of aspects 1 to 12, wherein the apparatus comprises a camera device.

Aspect 14. The apparatus of any one of aspects 1 to 13, wherein the apparatus comprises a mobile device.

Aspect 15. The apparatus of any one of aspects 1 to 14, wherein the one or more losses associated with the third 3D mesh parameters are determined based on the first 3D mesh parameters, the second 3D mesh parameters, and the relative rotation and translation parameters.

Aspect 16. A method comprising: determining, based on a first image of a target, first three-dimensional (3D) mesh parameters for the target, wherein the first 3D mesh parameters correspond to a first coordinate reference frame associated with the first image; determining, based on a second image of the target, second 3D mesh parameters for the target, wherein the second 3D mesh parameters correspond to a second coordinate reference frame associated with the second image; determining third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image; and determining one or more losses associated with the third 3D mesh parameters, the one or more losses being based on the first 3D mesh parameters, the second 3D mesh parameters, and the relative rotation and translation parameters; and generating adjusted 3D mesh parameters based on the third 3D mesh parameters and one or more losses associated with the third 3D mesh parameters, the adjusted 3D mesh parameters comprising one or more adjustments to the third 3D mesh parameters.

Aspect 17. The method of aspect 16, wherein the first coordinate reference frame comprises a first root-relative frame and the second coordinate reference frame comprises a second root-relative relative frame, and wherein the third coordinate reference frame comprises a real-world coordinate frame in a scene associated with the first image and the second image.

Aspect 18. The method of aspect 17, wherein, to determine the third 3D mesh parameters, the one or more processors are configured to: convert 3D coordinates in the first root-relative frame and the second root-relative frame to 3D coordinates in the real-world coordinate frame; and determine the third 3D mesh parameters based on the 3D coordinates in the real-world coordinate frame, the third 3D mesh parameters modeling the target in the real-world coordinate frame.

Aspect 19. The method of aspect 18, wherein the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

Aspect 20. The method of any one of aspects 16 to 19, wherein, to determine the first 3D mesh parameters and the second 3D mesh parameters, the one or more processors are configured to: determine a first root-relative pose of the target in the first image and a second root-relative pose of the target in the second image, wherein the first 3D mesh parameters comprise the first root-relative pose and the second 3D mesh parameters comprise the second root-relative pose.

Aspect 21. The method of any one of aspects 16 to 20, wherein the one or more processors are configured to: transform the third 3D mesh parameters to the first coordinate reference frame and the second coordinate reference frame; and align the third 3D mesh parameters with root-relative coordinates associated with the first 3D mesh parameters and the second 3D mesh parameters.

Aspect 22. The method of aspect 21, wherein the third 3D mesh parameters are aligned with the root-relative coordinates by subtracting a depth of root associated with the root-relative estimates associated with the first 3D mesh parameters and the second 3D mesh parameters.

Aspect 23. The method of any one of aspects 21 or 22, wherein the one or more processors are configured to: determine the one or more losses based on the second 3D mesh and the third 3D mesh, the one or more losses comprising a loss between the second 3D mesh and the third 3D mesh.

Aspect 24. The method of any one of aspects 16 to 23, wherein the one or more losses are calculated based on a least square errors function, and wherein, to determine adjusted 3D mesh parameters, the one or more processors are configured to minimize an error in the third 3D mesh parameters based on the least square errors function.

Aspect 25. The method of any one of aspects 16 to 24, wherein, to determine one or more losses, the one or more processors are configured to: generate, based on the third 3D mesh parameters and the relative rotation and translation parameters, a first 3D mesh in the first coordinate reference frame and a second 3D mesh in the second coordinate reference frame.

Aspect 26. The method of any one of aspects 16 to 25, wherein the one or more processors are configured to generate a 3D mesh model based on the adjusted 3D mesh parameters.

Aspect 27. The method of any one of aspects 16 to 26, wherein the target comprises an articulated object and the 3D mesh model comprises a skinned model, and wherein the first image and the second image comprise monocular images.

Aspect 28. The method of any one of aspects 16 to 27, wherein the one or more losses associated with the third 3D mesh parameters are determined based on the first 3D mesh parameters, the second 3D mesh parameters, and the relative rotation and translation parameters.

Aspect 29. A non-transitory computer-readable medium having stored thereon instructions which, when executed by one or more processors, cause the one or more processors to perform operations according to any of aspects 1 to 28.

Aspect 30. An apparatus comprising means for performing operations according to any of aspects 1 to 28.

What is claimed is:
1. An apparatus comprising:
at least one memory; and
one or more processors coupled to the at least one memory, the one or more processors being configured to:
determine, based on a first image of a target, first three-dimensional (3D) mesh parameters for the target, wherein the first 3D mesh parameters correspond to a first coordinate reference frame associated with the first image;
determine, based on a second image of the target, second 3D mesh parameters for the target, wherein the second 3D mesh parameters correspond to a second coordinate reference frame associated with the second image;
determine third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image;

transform the third 3D mesh parameters to the first coordinate reference frame and the second coordinate reference frame to generate transformed third 3D mesh parameters;

align the transformed third 3D mesh parameters with the first 3D mesh parameters and the second 3D mesh parameters; and generate adjusted 3D mesh parameters based on one or more losses associated with aligning the transformed third 3D mesh parameters with the first 3D mesh parameters and the second 3D mesh parameters, the adjusted 3D mesh parameters comprising one or more adjustments to the third 3D mesh parameters.

2. The apparatus of claim 1, wherein the first coordinate reference frame comprises a first root-relative frame and the second coordinate reference frame comprises a second root-relative frame, and wherein the third coordinate reference frame comprises a real-world coordinate frame in a scene associated with the first image and the second image.

3. The apparatus of claim 2, wherein, to determine the third 3D mesh parameters, the one or more processors are configured to:

convert 3D coordinates in the first root-relative frame and the second root-relative frame to 3D coordinates in the real-world coordinate frame; and determine the third 3D mesh parameters based on the 3D coordinates in the real-world coordinate frame, the third 3D mesh parameters modeling the target in the real-world coordinate frame.

4. The apparatus of claim 3, wherein the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

5. The apparatus of claim 1, wherein, to determine the first 3D mesh parameters and the second 3D mesh parameters, the one or more processors are configured to:

determine a first root-relative pose of the target in the first image and a second root-relative pose of the target in the second image, wherein the first 3D mesh parameters comprise the first root-relative pose and the second 3D mesh parameters comprise the second root-relative pose.

6. The apparatus of claim 1, wherein, to align the transformed third 3D mesh parameters with the first 3D mesh parameters and the second 3D mesh parameters, the one or more processors are configured to:

align the third 3D mesh parameters with root-relative coordinates associated with the first 3D mesh parameters and the second 3D mesh parameters.

7. The apparatus of claim 6, wherein the third 3D mesh parameters are aligned with the root-relative coordinates by subtracting a depth of root associated with root-relative estimates associated with the first 3D mesh parameters and the second 3D mesh parameters.

8. The apparatus of claim 6, wherein the one or more processors are configured to:

determine the one or more losses based on a second 3D mesh associated with the second 3D mesh parameters and a third 3D mesh associated with the third 3D mesh parameters, the one or more losses comprising a loss between the second 3D mesh and the third 3D mesh.

9. The apparatus of claim 1, wherein the one or more losses are calculated based on a least square errors function, and wherein, to determine adjusted 3D mesh parameters, the one or more processors are configured to minimize an error in the third 3D mesh parameters based on the least square errors function.

10. The apparatus of claim 1, wherein, to determine one or more losses, the one or more processors are configured to:

generate, based on the third 3D mesh parameters and the relative rotation and translation parameters, a first 3D mesh in the first coordinate reference frame and a second 3D mesh in the second coordinate reference frame.

11. The apparatus of claim 1, wherein the one or more processors are configured to generate a 3D mesh model based on the adjusted 3D mesh parameters.

12. The apparatus of claim 11, wherein the target comprises an articulated object and the 3D mesh model comprises a skinned model, and wherein the first image and the second image comprise monocular images.

13. The apparatus of claim 1, wherein the apparatus comprises a camera device.

14. The apparatus of claim 1, wherein the apparatus comprises a mobile device.

15. The apparatus of claim 1, wherein the one or more losses associated with the third 3D mesh parameters are determined based on the first 3D mesh parameters, the second 3D mesh parameters, and the relative rotation and translation parameters.

16. A method comprising:

determining, based on a first image of a target, first three-dimensional (3D) mesh parameters for the target, wherein the first 3D mesh parameters correspond to a first coordinate reference frame associated with the first image;

determining, based on a second image of the target, second 3D mesh parameters for the target, wherein the second 3D mesh parameters correspond to a second coordinate reference frame associated with the second image;

determining third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image;

determining one or more losses associated with the third 3D mesh parameters, the one or more losses being based on the first 3D mesh parameters, the second 3D mesh parameters, and the relative rotation and translation parameters;

transforming the third 3D mesh parameters to the first coordinate reference frame and the second coordinate reference frame to generate transformed third 3D mesh parameters;

aligning the transformed third 3D mesh parameters with the first 3D mesh parameters and the second 3D mesh parameters; and generating adjusted 3D mesh parameters based on one or more losses associated with aligning the transformed third 3D mesh parameters with the first 3D mesh parameters and the second 3D mesh parameters, the adjusted 3D mesh parameters comprising one or more adjustments to the third 3D mesh parameters.

17. The method of claim 16, wherein the first coordinate reference frame comprises a first root-relative frame and the second coordinate reference frame comprises a second root-relative frame, and wherein the third coordinate reference frame comprises a real-world coordinate frame in a scene associated with the first image and the second image.

18. The method of claim 17, wherein determining the third 3D mesh parameters comprises:
convert 3D coordinates in the first root-relative frame and the second root-relative frame to 3D coordinates in the real-world coordinate frame; and
determine the third 3D mesh parameters based on the 3D coordinates in the real-world coordinate frame, the third 3D mesh parameters modeling the target in the real-world coordinate frame.

19. The method of claim 18, wherein the 3D coordinates in the first root-relative frame and the second root-relative frame are converted to the 3D coordinates in the real-world coordinate frame based on the relative rotation and translation parameters and depth information associated with the first 3D mesh parameters and the second 3D mesh parameters.

20. The method of claim 16, wherein determining the first 3D mesh parameters and the second 3D mesh parameters comprises:
determine a first root-relative pose of the target in the first image and a second root-relative pose of the target in the second image, wherein the first 3D mesh parameters comprise the first root-relative pose and the second 3D mesh parameters comprise the second root-relative pose.

21. The method of claim 16, wherein aligning the transformed third 3D mesh parameters with the first 3D mesh parameters and the second 3D mesh parameters comprises:
aligning the third 3D mesh parameters with root-relative coordinates associated with the first 3D mesh parameters and the second 3D mesh parameters.

22. The method of claim 21, wherein the third 3D mesh parameters are aligned with the root-relative coordinates by subtracting a depth of root associated with root-relative estimates associated with the first 3D mesh parameters and the second 3D mesh parameters.

23. The method of claim 21, further comprising:
determining the one or more losses based on a second 3D mesh associated with the second 3D mesh parameters and a third 3D mesh associated with the third 3D mesh parameters, the one or more losses comprising a loss between the second 3D mesh and the third 3D mesh.

24. The method of claim 16, wherein the one or more losses are calculated based on a least square errors function, and wherein, to determine adjusted 3D mesh parameters, the method further comprising minimizing an error in the third 3D mesh parameters based on the least square errors function.

25. The method of claim 16, wherein determining one or more losses comprises:
generating, based on the third 3D mesh parameters and the relative rotation and translation parameters, a first 3D mesh in the first coordinate reference frame and a second 3D mesh in the second coordinate reference frame.

26. The method of claim 16, further comprising generating a 3D mesh model based on the adjusted 3D mesh parameters.

27. The method of claim 26, wherein the target comprises an articulated object and the 3D mesh model comprises a skinned model, and wherein the first image and the second image comprise monocular images.

28. The method of claim 16, wherein the one or more losses associated with the third 3D mesh parameters are determined based on the first 3D mesh parameters, the second 3D mesh parameters, and the relative rotation and translation parameters.

29. A non-transitory computer-readable medium having stored thereon instructions which, when executed by one or more processors, cause the one or more processors to:
determine, based on a first image of a target, first three-dimensional (3D) mesh parameters for the target, wherein the first 3D mesh parameters correspond to a first coordinate reference frame associated with the first image;
determine, based on a second image of the target, second 3D mesh parameters for the target, wherein the second 3D mesh parameters correspond to a second coordinate reference frame associated with the second image;
determine third 3D mesh parameters for the target in a third coordinate reference frame, the third 3D mesh parameters being based on the first 3D mesh parameters, the second 3D mesh parameters, and relative rotation and translation parameters of a first image sensor that captured the first image and a second image sensor that captured the second image;
transform the third 3D mesh parameters to the first coordinate reference frame and the second coordinate reference frame to generate transformed third 3D mesh parameters;
align the transformed third 3D mesh parameters with the first 3D mesh parameters and the second 3D mesh parameters; and
generate adjusted 3D mesh parameters based on one or more losses associated with aligning the transformed third 3D mesh parameters with the first 3D mesh parameters and the second 3D mesh parameters, the adjusted 3D mesh parameters comprising one or more adjustments to the third 3D mesh parameters.

30. The non-transitory computer-readable medium of claim 29, wherein the first coordinate reference frame comprises a first root-relative frame and the second coordinate reference frame comprises a second root-relative frame, and wherein the third coordinate reference frame comprises a real-world coordinate frame in a scene associated with the first image and the second image.

* * * * *